(12) United States Patent  (10) Patent No.: US 8,649,043 B2
Cain                      (45) Date of Patent:     Feb. 11, 2014

(54) METHODS OF EXPORTING PRINT JOBS FROM A PRINT SHOP MANAGEMENT PROGRAM

(75) Inventor: Shane Matthew Cain, Carlsbad, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 968 days.

(21) Appl. No.: 12/569,321

(22) Filed: Sep. 29, 2009

(65) Prior Publication Data

US 2011/0075195 A1    Mar. 31, 2011

(51) Int. Cl.
    *G06F 15/00* (2006.01)

(52) U.S. Cl.
    USPC ........ 358/1.15; 358/1.16; 358/1.13; 715/255; 715/209

(58) Field of Classification Search
    USPC ............. 358/1.15, 1.16, 1.13; 715/255, 209
    See application file for complete search history.

(56) References Cited

U.S. PATENT DOCUMENTS

| 7,710,590 | B2 * | 5/2010 | de Beus et al. | 358/1.15 |
| 7,821,662 | B2 * | 10/2010 | Matsueda | 358/1.15 |
| 2004/0073684 | A1 * | 4/2004 | Jodra et al. | 709/228 |
| 2004/0239974 | A1 * | 12/2004 | Uchida et al. | 358/1.14 |
| 2008/0222071 | A1 * | 9/2008 | Bhatti | 706/47 |

* cited by examiner

*Primary Examiner* — King Poon
*Assistant Examiner* — Lawrence Wills
(74) *Attorney, Agent, or Firm* — Chen Yoshimura LLP

(57) ABSTRACT

A method implemented in a print shop management system for exporting print jobs from the print shop management program. The exporting method allows selection of an export job ticket format at the time of export. The export job ticket format may be a press device format suitable for consumption by a digital printing device, or an original input format that preserves the format of the original job ticket imported from an external program. For the press device format, an output job ticket in the requested format is generated from scratch based on job parameters stored in a job ticket database. For the original input format, a copy of the original job ticket is read from an input job ticket and exported; optionally, job parameters generated by the print shop management program may be incorporated into the copy of the input job ticket before exporting.

21 Claims, 5 Drawing Sheets

METHODS OF EXPORTING PRINT JOBS FROM A PRINT SHOP MANAGEMENT PROGRAM

BACKGROUND OF THE INVENTION

1. Field of the Invention

This invention relates to print shop management system and method, and in particular, it relates to method for exporting print jobs from a print shop management program.

2. Description of Related Art

In an environment that processes a large number of print jobs with multiple printers, there has been a need to manage print jobs efficiently in an organized fashion. Examples of such an environment are professional print shops and print/copy departments at large organizations, where a variety of print requests, such as large-volume duplication and large document printing, needs to be processed and completed by utilizing multiple printers within a short turn-around time. These environments are collectively referred to as "print shops" in this application. Typically, each printing job specifies a source file that electrically contains a document to be printed, the size, color and the type of the paper on which the document should be printed, the printing resolution, duplex or single-side printing, and certain finishing conditions, such as book, staple, collate printing, etc., depending on a print job requester's needs.

In order to process a large volume of print jobs that each differ in terms of these job parameters, a print shop utilizes multiple commercial grade printers, including black & white and color printers. Each of these printers has limitations on available printer settings, such as the paper size, the paper type, resolution settings, etc. In addition, the print shop employs various finishing devices, such as collators, staplers, hole punchers, folding machines, binding machines, etc. A print shop management system is typically implemented by software or firmware programs executed by a print shop management apparatus such as a control computer connected to the printers. The print shop management system submits each print job to one or more printers and finishing devices to produce the print job. The job submission may be done automatically by the print shop management system, semi-automatically with certain amount of operator intervention, or manually where decisions of how to submit the print jot to appropriate printers or finishing devices are made by an operator.

The print shop management system organizes and manages print jobs using database entries, typically referred to as "job tickets." A job ticket specifies values of various print job parameters, and associates itself to the source file(s). In one particular example, a job ticket may include a job ticket number, ticket name as well as the values of the following groups of various other job parameters: job information settings, basic settings (number of copies, orientation of paper, collate, offset printing, original paper size, output paper size, paper type, paper source, etc.), layout settings, cover sheet, finishing settings, inter-sheet settings, tab-paper settings, image quality settings, and customer information. A job ticket is associated with a source file (i.e. the document to be printed), and they collectively constitute a print job within the print shop management system.

Job tickets may be exported by the print shop management program so that the print jobs may be manipulated by other devices. Conventionally, exporting job tickets from the print shop management program involves selecting a print job and exporting a compressed file containing the source file and an associated job ticket file. This process provides a job ticket file to the operator for manual manipulation and/or external use.

In a conventional print job export method, the operator selects an "Export" option in a user interface (UI) of a print shop management program. The operator then manually chooses a destination folder location for the job ticket and the source file. Once the folder is chosen, the job ticket and source file are exported to this location.

SUMMARY

In conventional print job exporting methods, job tickets are exported in a format specific to the target printing device for which the exported print job is intended. Conventional methods do not provide an option to export the job ticket in its original input format as received by the print shop management program, i.e., in the format that is not altered by the print shop management program. As a result, an original application that generated the job ticket may not be able to support a job ticket exported by the print shop management program, so the user cannot easily move a print job (the source file and the job ticket) back to the original application. Furthermore, using the conventional exporting method, job tracking becomes increasingly complex after a print job is exported into an external folder designated by the user. Communication on the status or location of an exported print job is also difficult. Finally, conventional print job exporting methods do not provide administrative control policies regarding exporting. Allowing all job types to be exported by all users may not be desirable to print shop managers due to concerns about maintaining a strict job workflow.

Accordingly, the present invention is directed to an improved print job export method and related apparatus that substantially obviates one or more of the problems due to limitations and disadvantages of the related art.

An object of the present invention is to provide an export policy for exporting print jobs. The export policy is configured during application administration and enforced at the time of export.

Another object of the present invention is to provide advanced options for export settings offered to the operator at the time of export.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a print shop management apparatus for exporting print jobs, which includes: (a) storing a plurality of input job tickets in an input job ticket repository, each input job ticket corresponding to a print job and including a plurality of job parameters, each input job ticket being in one of a plurality of input job ticket formats; (b) storing a plurality of job tickets in a job ticket database, each job ticket corresponding to a print job and including a plurality of job parameters, wherein at least some of the job tickets in the job ticket database are generated from some of the input job tickets; (c) receiving a command for exporting a print job, the command specifying a press device format or an original input format for the exported print job; (d) if the command specifies the press device format, (d1) accessing the job ticket database to obtain job parameters of the job ticket corresponding to the print job to be exported, (d2) generating an output job ticket in the press device format based on the obtained job parameters, and (d3) writing the output job ticket to a destination location; and (e) if the command specifies the original input format, (e1) reading from the input job ticket repository the input job ticket corresponding to the print job to be exported, and (e2) writing the input job ticket to a destination location.

In one example, the command in step (c) specifies an original input format and further specifies a request to include system-generated parameters, and wherein step (e) further includes, before step (e2): (e3) accessing the job ticket database to obtain job parameters of the job ticket corresponding to the print job to be exported, and (e4) modifying the input job ticket read from the input job ticket repository by incorporating the job parameters obtained from the job ticket database without changing the input job ticket format.

In another aspect, the present invention provides a computer program product that causes a data processing apparatus to perform the above method.

In another aspect, the present invention provides a print shop management system which includes: a plurality of printing devices; a server connected to the plurality of printing devices; an input job ticket repository accessible by the server and storing a plurality of input job tickets, each input job ticket corresponding to a print job and including a plurality of job parameters, each input job ticket being in one of a plurality of input job ticket formats; a job ticket database accessible by the server and storing a plurality of job tickets in, each job ticket corresponding to a print job and including a plurality of job parameters; wherein the server generates at least some of the job tickets in the job ticket database from some of the input job tickets, wherein the server submits print jobs to selected printing devices for printing, wherein the server exports a print job in response to an export command, the export command specifying a press device format or an original input format for the exported print job, wherein if the command specifies the press device format, the server accesses the job ticket database to obtain job parameters of the job ticket corresponding to the print job to be exported, generates an output job ticket in the press device format based on the obtained job parameters, and writes the output job ticket to a destination location, and if the command specifies the original input format, the server reads from the input job ticket repository the input job ticket corresponding to the print job to be exported, and writes the input job ticket to a destination location.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
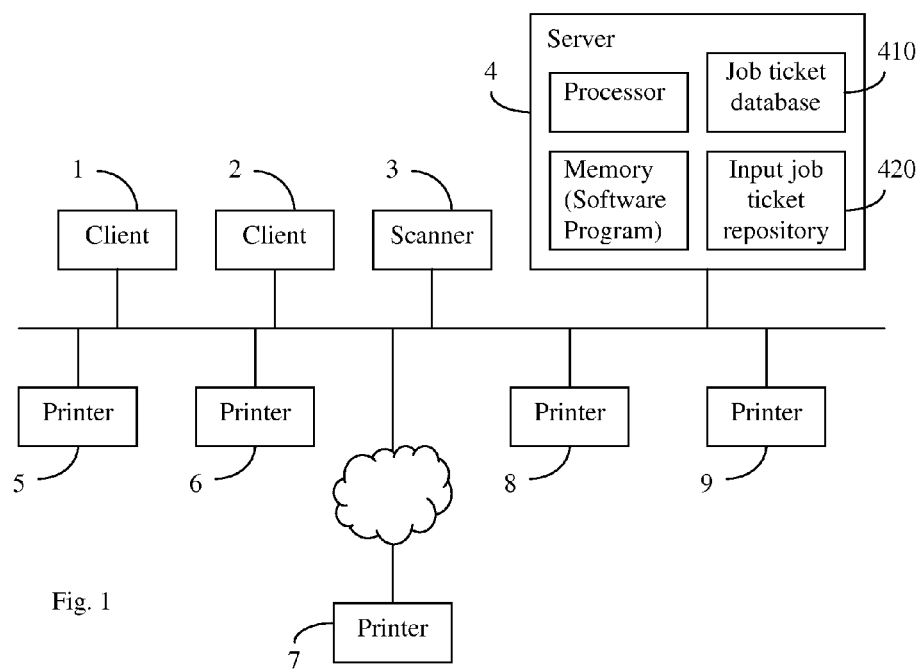
FIG. 1 schematically illustrates a print management system having multiple printers and a print job management server in which embodiments of the present invention can be implemented.

FIG. 1 illustrates an example of a print shop having multiple printers, where embodiments of the present invention may be implemented. In the print shop system, client computers 1 and 2 are connected to a server 4 via a local area network (LAN). Scanner 3 is also connected to server 4 via the LAN. In this example, printers 5-9 are commercial standard high-end printers that can handle high speed, high quality printing. Each of the printers 5-9 has multiple paper trays to store paper of various sizes, color, and types. Further, some of the printers 5-9 are equipped with a sophisticated output sorting mechanism with multiple output trays to perform collate printing or other print finishing functions. Each printer has one or more display monitors to display the status of the printing and various warning and instruction messages to a user. Each printer is equipped with its own central processing unit (CPU) and appropriate hardware/software to control its own printing operations, and communicates with server 4 via a LAN. Some of these printers may also be multifunction printers that can perform copying and scanning of documents. Appropriate server software is installed in server 4 to perform various standard network administrative functions.

According to embodiments of the present invention, in addition to the server administrative software, print job management software is installed on server 4 for managing a large number of print jobs that come into the print shop. The print job management software program may be stored in either of a read only memory (ROM) or a hard disk drive (HDD), which can be accessed by the CPU of the server 4. Once a print shop operator calls the print job management software, server 4 reads out the print job management software from the ROM or HDD to a random access memory (RAM) of the server to carry out various functions of the software, including management of print jobs. The print job management software preferably is designed to run on Windows OS, Macintosh OS, or Unix X Windows or other computer operating systems implementing a GUI (graphic user interface), such as a touchscreen and/or a mouse and a keyboard, coupled with a display monitor. Server 4 (or any suitable data processing apparatus) running print job management software of embodiments of the present invention is hereinafter referred to as "print job management server." In this application, the terms "print job management server" and "print job management apparatus" broadly refer to any data processing apparatus that can implement various features of embodiments of the present invention described below with appropriate hardware/software.

While FIG. 1 shows a print shop environment, the invention is not limited to any physical setting of a shop or network, and can be applied to a print shop system having a distributed setting where printers at different locations are connected to a server. In particular, it should be apparent that one or more of the components of the print shop system can communicate with the rest of the system via virtual private network (VPN) or similar means through the Internet. Moreover, in FIG. 1, although the server 4 functions as the print job management server as well as the network server, a separate stand-alone computer may be provided to run the print job management software. In the alternative, when properly configured, one of the client computers 1 and 2 or the computers attached to one of the printers 5-9 (if such a printer exists among them) may be used to assume the role of the print job management server. Further, a print management system of the present invention can be implemented in a proprietary hardware system that is specifically designed to perform the above-described various functionalities of the print management system.

A print job is a print request specifying various desired options or requirements together with one or more documents to be printed. Print jobs typically originate from customers, who may provide the printing requirements in a manual or automated way. The print jobs are inputted to server 4. This way, numerous print jobs are generated and/or collected by server 4 on which print job management software is running. The print job management server 4 processes and manages the print jobs, including submitting them to appropriate printing devices for printing and finishing.

Print jobs are organized by using database entries, called "job tickets." A job ticket specifies values of various print job parameters, and associates itself to the source file(s). In one particular example, a job ticket may include a job ticket number, ticket name as well as the values of the following groups of various other job parameters: job information settings, basic settings (number of copies, orientation of paper, collate, offset printing, original paper size, output paper size, paper type, paper source, etc.), layout settings, cover sheet, finishing settings, inter-sheet settings, tab-paper settings, image quality settings, and customer information.

Job tickets may be generated in a number of ways. A print shop operator may manually enter the values of job parameters using a job ticket editor (a graphic user interface or UI) of the print shop management program based on instructions and information received from a customer. In addition, the server 4 may be configured to access and analyze the source file (i.e. the document to be printed) to determine the values of some of the job parameter directly, and automatically enters these values in the job ticket. Alternatively, a print job including the job ticket may be imported to the print shop management program from an external program, including third party desktop applications such as Adobe Acrobat Professional, or other print shop management or workflow control programs, which may be executed by the server 4 or an external data processing apparatus such as a client 1. The print shop management program may further edit the imported job ticket.

Embodiments of the present invention provide a method for exporting print jobs from the print shop management program. The exporting method offers a number of features that facilitate convenient and efficient handling of print jobs. It allows selection of an export job ticket format, and allows selection from a pre-generated list of export hot folder destinations. In addition, it provides email notification of each export which improves job status tracking and notification in the workflow, and allows a shop manager to control export functions which can help to preserve workflow integrity.

Figure 2:
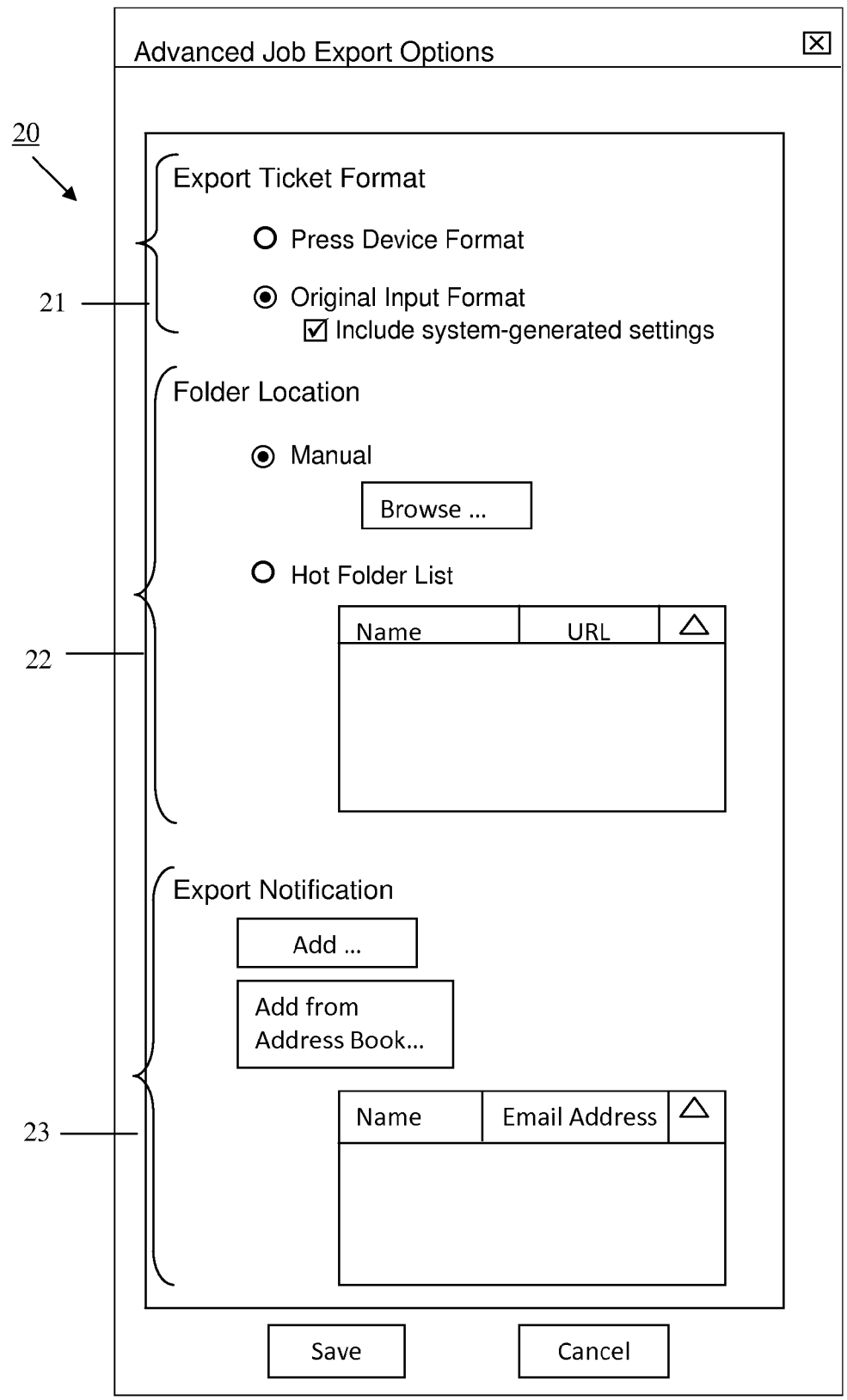
FIG. 2 illustrates a user interface display of the print shop management program for specifying job export options according to an embodiment of the present invention.

FIG. 2 illustrates a user interface (UI) display of the print shop management program for specifying job export options. As shown in FIG. 2, the UI window 20 has an input feature 21 that allows selection of a format of exported job ticket. The job ticket formats that the user may select include a press device format, which is a format suitable for digital press (printing device) consumption, and an original input format, which preserves the original format of the input job ticket as received by the print shop management program from an external program. In one embodiment, the press device format is a JDF IDP ticket format (Job Definition Format Integrated Digital Printing). Other press device formats may be used. Alternatively, multiple press device formats may be supported, and the operator may specify one of the several such formats.

The UI 20 further includes an input feature 22 for the operator to specify a destination location to export the print job to. The operator may manually select a file folder using a browse function of the UI, or choose from one of a list of "hot folders" (i.e. a pre-defined list of destination folders). The "hot folders" list may be setup and configured by a print shop administrator or manager as described in more detail later.

Within the print shop management system, the parameters for each print job are stored in a job ticket database 410 (see FIG. 1). The form in which the parameters are stored in the database is typically not related to any job ticket format suitable for export. These job ticket parameters may originate from an operator via a job ticket editor UI, or they may be generated by parsing input job tickets and/or analyzing the source file. Further, the print shop management program maintains an input job ticket repository 420 to store input job tickets that are imported from external programs during creation of the job (see FIG. 1). These input job tickets are stored in the repository in their original format. In FIG. 1, the job ticket database 410 and the input job ticket repository 420 are shown as being a part of the server 4, but they can also be stored in a storage device such as a hard drive connected to the server 4.

Figure 3:
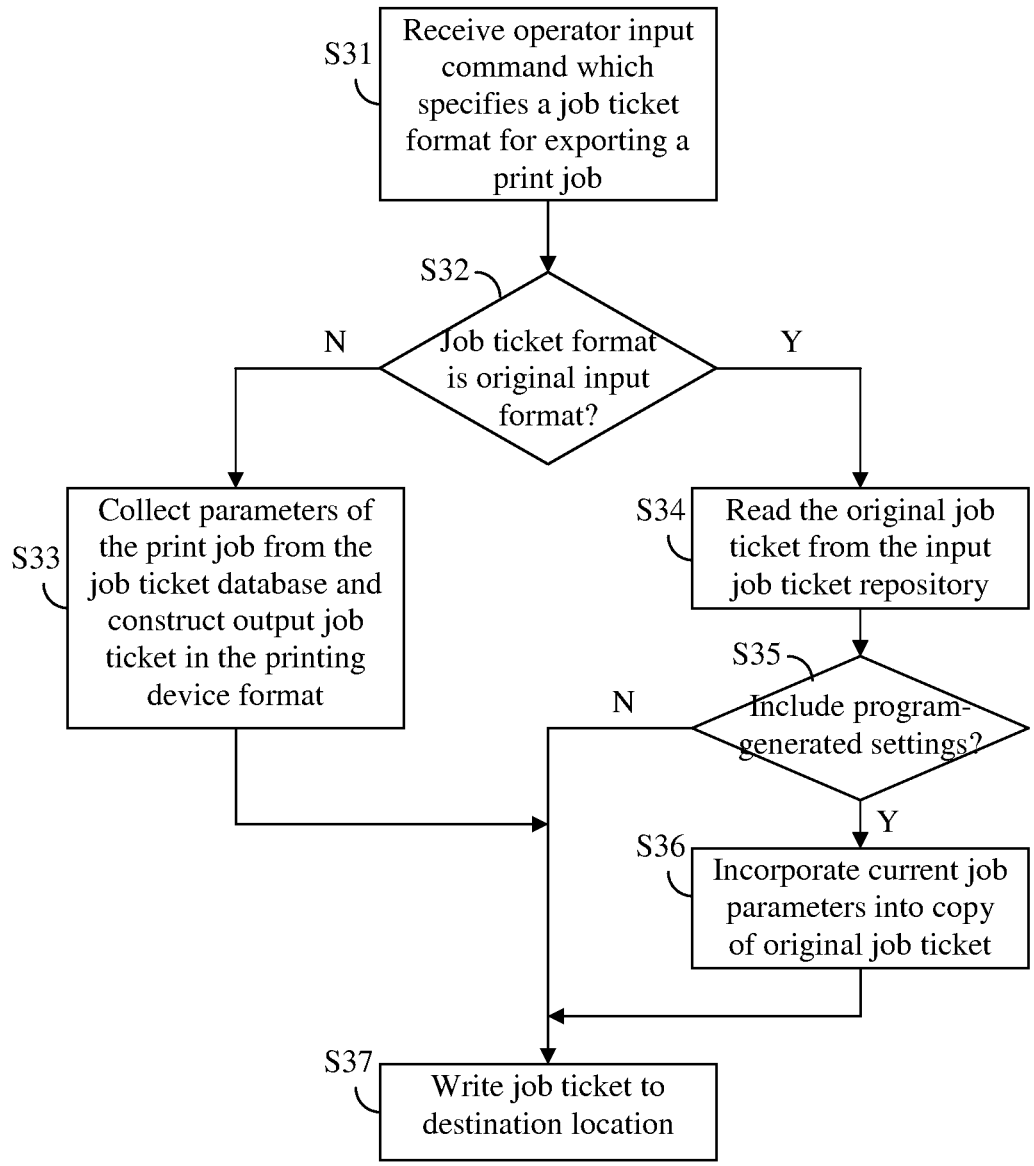
FIG. 3 schematically illustrates a method of exporting a print job according to an embodiment of the present invention.

Referring to FIG. 3 (a process executed by the print shop management system), when exporting a print job, the print shop management program receives a command from the operator (via the UI) which specifies a job ticket format for exporting a print job (step S31). If the operator input specifies a press device format ("N" in step S32), the print shop management program collects the parameters for the print job from the job ticket database and constructs an output job ticket in the press device format (step S33). If the operator input specifies the original input format ("N" in step S32), the print shop management program reads the original job ticket from the input job ticket repository (step S34). The original job ticket remains in the repository. The print shop management program then writes the job ticket obtained in steps S33 or S34 to the destination location specified by the operator (step S37).

Referring back to the UI shown in FIG. 2, when the operator sets the export settings using the input feature 21, if he selects the original input format, he may further select an "include system-generated settings" option to incorporate job ticket settings (i.e. parameters) generated by the print shop management program into the original input ticket before exporting.

Referring again to FIG. 3, if the "include system-generated settings" option is not selected ("N" in step S35), the original job ticket is written to the destination location without changes or manipulations by the print shop management program (step S37). If the "include system-generated settings" option is selected ("Y" in step S35), the print shop management program accesses the job ticket database to retrieve all current parameters for this print job and incorporates them into the original job ticket to generate a modified job ticket in the original format (step S36). Incorporating the current parameters means that the current parameters are either added to the job ticket if they did not exist in the original job ticket, or they replace existing parameters copied from the original ticket, without changing the format of the input job ticket. It should be noted that in this process, a copy of the original job ticket is manipulated and the original job ticket stored in the repository is not changed. The print shop management program then writes the resulting modified job ticket to the destination location (step S37).

The exported job ticket can be used to create jobs later in other applications, to re-do jobs in applications that do not support saving history, to manipulate exported job tickets by hand, etc.

Some examples of practical scenarios of the print job export methods are described below as examples. In a first example, the print job was created by the print shop management program (i.e. by the operator using a job editor UI), and there is no original ticket. The print job management program can export a job ticket in the press device format by creating it using parameters collected from the job ticket database (i.e. step S33 of FIG. 3).

In a second example, the original job ticket is inputted into the print shop management program from an MIS system (Management Information System). The operator chooses to export a job ticket in the original input format, and chooses to include system-generated settings. In this case, step S36 in FIG. 3 includes the following. The print shop management program creates a new (temporary) JDF IDP format job ticket from scratch using current job parameters from the database (this is similar to the process of step S33), and holds the new job ticket in memory. The program then embeds this new job ticket inside a copy of the original MIS ticket read from the input job ticket repository, forming an output job ticket. Typically an MIS job ticket is also in the JDF format, in which case the new job ticket can be embedded in the MIS format copy of the original job ticket in a manner well known to those in the relevant art. If the MIS job ticket not in the JDF format, the print shop management program may embed the new JDF IDP format job ticket inside the root XML element of the copy of the original job ticket.

In a third example, the original ticket is inputted into the print shop management program from a prepress application. A prepress application is a computer application capable of performing desired processes that occur between the procurement of a manuscript and original artwork, and the manufacture of a digitally printed version, such as pre-flight, proofing, imposition, etc. The operator chooses to export a job ticket in the original input format, and chooses to include system-generated settings. In this case, step S36 in FIG. 3 includes the following. The print shop management program creates a new JDF IDP ticket from scratch using current job parameters from the database, and holds the new job ticket in memory. The program then embeds this ticket in a memory copy of the original prepress job ticket read from the input job ticket repository, forming an output job ticket. Typically a prepress ticket is in the JDF format, in which case the new job ticket can be embedded in the prepress format copy of the original job ticket in a manner well known to those in the relevant art. If the prepress job ticket not in the JDF format, the print shop management program may embed the new JDF IDP format job ticket inside the root XML element of the copy of the original job ticket.

In a fourth example, the original ticket is in the JDF IDP format and is inputted into the print shop management program from a press application. A press application is a computer application that executes press processes such as layout preparation, interpreting, rendering, digital printing, etc. The operator chooses to export a job ticket in the original input format, and chooses to include system-generated settings. In this case, step S36 in FIG. 3 includes the following. The print shop management program reads the original JDF IDP format ticket into memory, and replaces job ticket parameters of the memory copy with current job parameters from the database. If certain parameters in the original job ticket do not have corresponding current parameters in the database, then they are left in the job ticket. The modified copy of the original job ticket becomes the output job ticket.

In the above examples, the job ticket formats are in JDF, which is a format widely used today. Embedding and manipulation of JDF files and JDF formats are well documented and known in the field. However, the invention is not limited to JDF formats; other formats (including proprietary ones and formats that will be created in the future) can be implemented using the job ticket exporting method described above. Any suitable formats can be used, so long as it can achieve the goal of providing the operator an option to include current job ticket parameters in the exported job ticket.

Referring back to FIG. 2, the UI 20 further provides an input feature 23 for specifying an export notification function to notify designated personnel of print job exports. The export notifications may be delivered by electronic mail, which results in an email containing information about the exported job being sent to one or more recipients. The email is preferably sent immediately following the export. Email notification of export may help improve job status tracking and notification in the workflow. As shown in FIG. 2, using the input feature 23, the operator can specify the email addresses (or selects from an address book) for the intended recipients of the notification. Alternatively, the notifications may be delivered to recipients via short text messages on mobile communication devices such as cellular phones, or other suitable types of electronic messages. In the latter cases, email addresses in the illustrated example would be replaced by phone numbers or other appropriate identification information.

Figure 4A:
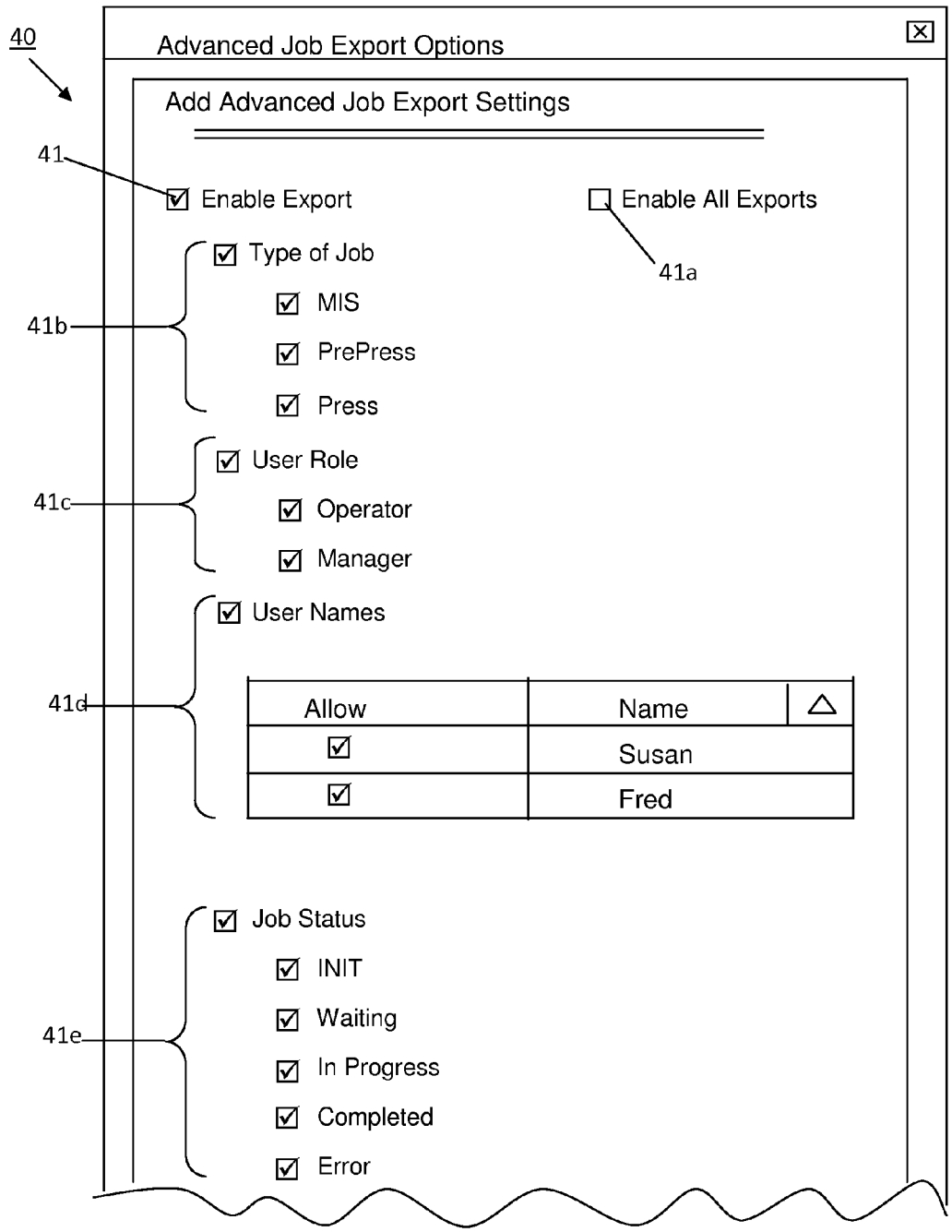
FIG. 4 illustrates a user interface display of the print shop management program for setting export policies according to an embodiment of the present invention.
Figure 4B:
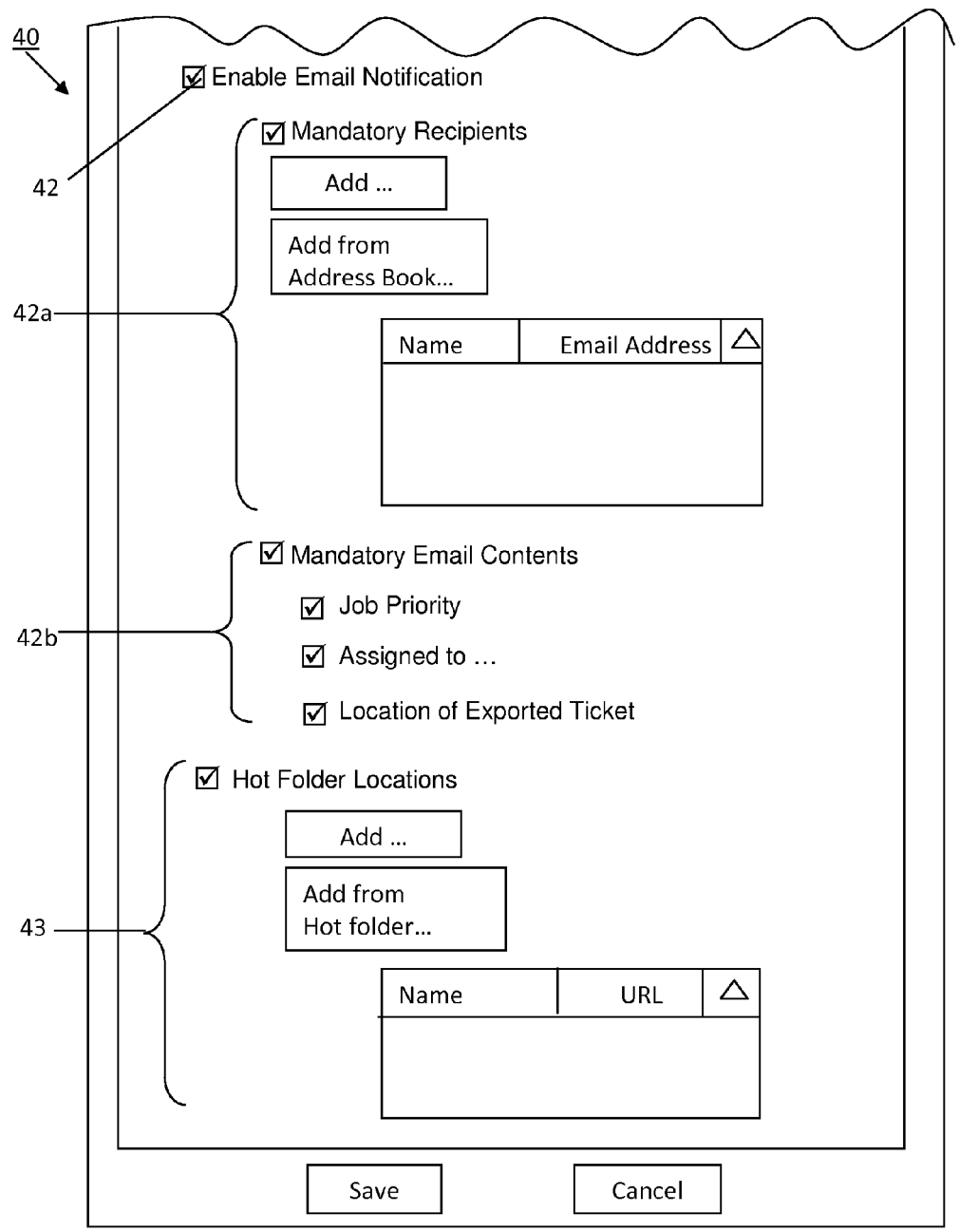

Embodiments of the present invention further provide means for a print shop administrator or manager to define rules regarding the exporting of job tickets. Various criteria make up a policy that can be activated for the system. FIGS. 4a and 4b illustrate another UI display of the print shop management program which can be used by the print shop administrator or manager to set job export policies.

As shown in FIG. 4a, the export policy setting UI 40 includes an input feature 41 that allows the administrator to enable or disable print job export. Additional input features 41a-e allow the administrator to specify the criteria for enabling or disabling export. For example, checking the checkbox 41a will enable all jobs to be exported. Input feature 41b specifies the types of print jobs (based on the origin of the job) for which export is enabled or disabled. For example, the administrator may disable exporting of jobs that came from an MIS system or a prepress system in order to maintain the integrity of the workflow. Input feature 41c specifies what type of operators (their levels, roles, etc.) are allowed or disallowed to perform job export. Input feature 41d specifies the specific users (identified by user names) who are allowed or disallowed to perform job export. Input feature 41e specifies the status of the print jobs for which export is enabled or disabled. The status may include, for example, initial state, waiting, in progress, completed, error, etc. For example, export may be disabled if the job is in progress. When the print shop management program receives a command from the operator to export a print job, it checks the print job and other conditions against the criteria for enabling or disabling export. This step will occur before step S32 in the process of FIG. 3.

The UI window 40 further allows the administrator to set other policies related to print job export. As shown in FIG. 4b, an input feature 42 allows the administrator to enable or disable email notifications of job exports. If "enable email notification" is selected, the administrator may set mandatory recipients and mandatory contents. Mandatory recipients, who will receive all email notifications, can be added manually or from an address book using the input feature 42a. As shown in FIG. 2, the operator may add recipients at the time of job export using the UI 20. Mandatory contents of the notification email can be specified using the input feature 42b.

The various contents include job priority, the operator the job is assigned to, the destination location of the exported job ticket, etc. The administrator may select one or more of these contents to be automatically included in all email notifications.

As shown in FIG. 4b, the UI window 40 further includes an input feature 43 to allow the administrator to specify a list of hot folder locations. For example, the administrator may set up separate hot folders for different external applications that will further process the exported job tickets. This provides more export folder selection options and better integrates third party application hot folders. These hot folders will then be displayed in the job export UI window 20 for the operator to choose from (see FIG. 2, item 22). As described earlier, when exporting a job using the UI window 20, the operator may choose a destination location from the hot folder list or manually enters a destination location using the input feature 22.

As seen from the above descriptions, the export policy setting UI 40 gives the administrator tools to control the exportation of important jobs and job types. Setting export policies allows print shop administrators and managers to control export functions which can help to preserve workflow integrity.

Although the UI displays shown in FIGS. 2, 4a and 4b show specific examples of graphical user interface elements, such as checkboxes, radio buttons, etc., the invention is not limited to the specifics of the UI displays. The UI displays may be implemented using any forms of graphical elements, as long as the user interface display includes input features (generally referred to here as input means) that allows the user to specify various settings. The input means may be buttons, check boxes, radio buttons, text input fields, drop-down menus, pop-up menus, icons, tabs for bringing up different sheets, separate windows, etc., or combinations thereof, or any other suitable structure of allowing the user to input information to the computer. The computer software designs for suitable structures of the input means are apparent and familiar to a person of ordinary skill in this field. Therefore, detailed descriptions for these structures are omitted from here. The term "user interface display" is used to generally mean any suitable screen display that displays information to the user and/or allows the user to input commands and other information, and is not limited to any specific form of display, and may include a series of consecutive displays.

It will be apparent to those skilled in the art that various modification and variations can be made in the improved print job export method and related apparatus of the present invention without departing from the spirit or scope of the invention. Thus, it is intended that the present invention cover modifications and variations that come within the scope of the appended claims and their equivalents.

What is claimed is:

1. A method implemented in a print shop management apparatus for exporting print jobs, comprising:
   (a) storing a plurality of input job tickets in an input job ticket repository, each input job ticket corresponding to a print job and including a plurality of job parameters, each input job ticket being in one of a plurality of input job ticket formats;
   (b) storing a plurality of job tickets in a job ticket database, each job ticket corresponding to a print job and including a plurality of job parameters, wherein at least some of the job tickets in the job ticket database are generated from some corresponding ones of the input job tickets and have a format different from any of the plurality of input job ticket formats;
   (c) receiving a command for exporting a print job, the print job to be exported corresponding to both an input job ticket in the input job repository and a job ticket in the job ticket database which has been generated from the corresponding input job ticket, the command specifying a press device format or an original input format for the exported print job and specifying a destination folder for the exported print job;
   (d) if the command specifies the press device format,
      (d1) accessing the job ticket database to obtain job parameters of the job ticket corresponding to the print job to be exported,
      (d2) generating an output job ticket in the press device format based on the obtained job parameters, and
      (d3) writing the output job ticket to the destination folder specified in the command; and
   (e) if the command specifies the original input format,
      (e1) reading from the input job ticket repository the input job ticket corresponding to the print job to be exported, and
      (e2) writing the input job ticket to the destination folder specified in the command.

2. The method of claim 1, wherein the command in step (c) specifies an original input format and further specifies a request to include system-generated parameters, and wherein step (e) further includes, before step (e2):
   (e3) accessing the job ticket database to obtain job parameters of the job ticket corresponding to the print job to be exported, and
   (e4) modifying the input job ticket read from the input job ticket repository by incorporating the job parameters obtained from the job ticket database without changing the input job ticket format.

3. The method of claim 2, wherein the input job ticket formats is an MIS format, a prepress format, or a JDF format, and wherein step (e4) includes generating a temporary job ticket in a JDF format based on the job parameters obtained from the job ticket database and embedding the temporary job ticket in the input job ticket read from the input job ticket repository.

4. The method of claim 1, further comprising:
   displaying in a first user interface a first input feature which shows a plurality of destination folders and which enables an operator to select one of the plurality of destination folders,
   wherein the command in step (c) further specifies one of the plurality of destination folders selected by the operator.

5. The method of claim 4, further comprising:
   displaying in a second user interface a second input feature which enables an administrator to define the plurality of destination folders to be displayed in the first user interface.

6. The method of claim 1, further comprising, after steps (d) and (e):
   sending a notification message regarding the exported print job to specified recipients, wherein the notification message includes information regarding one or more of a priority of the print job, an operator to whom the print job is assigned, and the destination folder of the exported print job.

7. The method of claim 6, further comprising:
   displaying in a user interface an input feature which enables an administrator to specify what information is to be included in the notification message and to specify a list of recipients of notification message for all print jobs to be exported.

8. A print shop management system comprising:
a plurality of printing devices;
a server connected to the plurality of printing devices;
an input job ticket repository accessible by the server and storing a plurality of input job tickets, each input job ticket corresponding to a print job and including a plurality of job parameters, each input job ticket being in one of a plurality of input job ticket formats;
a job ticket database accessible by the server and storing a plurality of job tickets, each job ticket corresponding to a print job and including a plurality of job parameters;
wherein the server generates at least some of the job tickets in the job ticket database from some corresponding ones of the input job tickets in the input job ticket repository, the generated job tickets having a format different from any of the plurality of input job ticket formats,
wherein the server submits print jobs to selected printing devices for printing,
wherein the server exports a print job in response to an export command, the print job to be exported corresponding to both an input job ticket in the input job repository and a job ticket in the job ticket database which has been generated from the corresponding input job ticket, the export command specifying a press device format or an original input format for the exported print job and specifying a destination folder for the exported print job,
wherein if the command specifies the press device format, the server accesses the job ticket database to obtain job parameters of the job ticket corresponding to the print job to be exported, generates an output job ticket in the press device format based on the obtained job parameters, and writes the output job ticket to the destination folder specified in the export command, and
if the command specifies the original input format, the server reads from the input job ticket repository the input job ticket corresponding to the print job to be exported, and writes the input job ticket to the destination folder specified in the export command.

9. The system of claim 8, wherein the export command specifies an original input format and further specifies a request to include system-generated parameters, and wherein in response thereto, the server accesses the job ticket database to obtain job parameters of the job ticket corresponding to the print job to be exported, and modifies the input job ticket read from the input job ticket repository by incorporating the job parameters obtained from the job ticket database without changing the input job ticket format, before writing the input job ticket to the destination folder.

10. The system of claim 9, wherein the input job ticket formats is an MIS format, a prepress format, or a JDF format, and wherein the server generates a temporary job ticket in a JDF format based on the job parameters obtained from the job ticket database and embeds the temporary job ticket in the input job ticket read from the input job ticket repository.

11. The system of claim 8, wherein the server displays in a first user interface a first input feature which shows a plurality of destination folders and which enables an operator to select one of the plurality of destination folders, and wherein the export command further specifies one of the plurality of destination folders selected by the operator.

12. The system of claim 11, wherein the server further displays in a second user interface a second input feature which enables an administrator to define the plurality of destination folders to be displayed in the first user interface.

13. The system of claim 8, wherein the server sends a notification message regarding the exported print job to specified recipients, the notification message including information regarding one or more of a priority of the print job, an operator to whom the print job is assigned, and the destination folders of the exported print job.

14. The system of claim 13, wherein the server further displays in a user interface an input feature which enables an administrator to specify what information is to be included in the notification message and to specify a list of recipients of notification message for all print jobs to be exported.

15. A computer program product comprising a computer usable non-transitory medium having a computer readable program code embedded therein for controlling a data processing apparatus, the computer readable program code configured to cause the data processing apparatus to execute a print job exporting process which comprise:
(a) storing a plurality of input job tickets in an input job ticket repository, each input job ticket corresponding to a print job and including a plurality of job parameters, each input job ticket being in one of a plurality of input job ticket formats;
(b) storing a plurality of job tickets in a job ticket database, each job ticket corresponding to a print job and including a plurality of job parameters, wherein at least some of the job tickets in the job ticket database are generated from some corresponding ones of the input job tickets and have a format different from any of the plurality of input job ticket formats;
(c) receiving a command for exporting a print job, the print job to be exported corresponding to both an input job ticket in the input job repository and a job ticket in the job ticket database which has been generated from the corresponding input job ticket, the command specifying a press device format or an original input format for the exported print job and specifying a destination folder for the exported print job;
(d) if the command specifies the press device format,
   (d1) accessing the job ticket database to obtain job parameters of the job ticket corresponding to the print job to be exported,
   (d2) generating an output job ticket in the press device format based on the obtained job parameters, and
   (d3) writing the output job ticket to the destination folder specified in the command; and
(e) if the command specifies the original input format,
   (e1) reading from the input job ticket repository the input job ticket corresponding to the print job to be exported, and
   (e2) writing the input job ticket to the destination folder specified in the command.

16. The computer program product of claim 15, wherein the command in step (c) specifies an original input format and further specifies a request to include system-generated parameters, and wherein step (e) further includes, before step (e2):
   (e3) accessing the job ticket database to obtain job parameters of the job ticket corresponding to the print job to be exported, and
   (e4) modifying the input job ticket read from the input job ticket repository by incorporating the job parameters obtained from the job ticket database without changing the input job ticket format.

17. The computer program product of claim 16, wherein the input job ticket formats is an MIS format, a prepress format, or a JDF format, and wherein step (e4) includes generating a temporary job ticket in a JDF format based on the job parameters obtained from the job ticket database and embedding the temporary job ticket in the input job ticket read from the input job ticket repository.

18. The computer program product of claim 15, wherein the exporting process further comprises:

displaying in a first user interface a first input feature which shows a plurality of destination folders and which enables an operator to select one of the plurality of destination folders, wherein the command in step (c) further specifies one of the plurality of destination folders selected by the operator.

19. The computer program product of claim 18, wherein the exporting process further comprises:

displaying in a second user interface a second input feature which enables an administrator to define the plurality of destination locations to be displayed in the first user interface.

20. The computer program product of claim 15, wherein the exporting process further comprises, after steps (d) and (e):

sending a notification message regarding the exported print job to specified recipients, wherein the notification message includes information regarding one or more of a priority of the print job, an operator to whom the print job is assigned, and the destination folder of the exported print job.

21. The computer program product of claim 20, wherein the exporting process further comprises:

displaying in a user interface an input feature which enables an administrator to specify what information is to be included in the notification message and to specify a list of recipients of notification message for all print jobs to be exported.

* * * * *